United States Patent [19]

Matsumoto

[11] 4,272,816
[45] Jun. 9, 1981

[54] OVERCURRENT PROTECTING APPARATUS

[75] Inventor: Yoshihiro Matsumoto, Tokyo, Japan

[73] Assignee: Tokyo Shibaura Denki Kabushiki Kaisha, Japan

[21] Appl. No.: 32,684

[22] Filed: Apr. 23, 1979

[30] Foreign Application Priority Data

Apr. 27, 1978 [JP] Japan ..................... 53-49312
Apr. 27, 1978 [JP] Japan ..................... 53-49324

[51] Int. Cl.³ .......................................... G06F 15/20
[52] U.S. Cl. ..................... 364/483; 361/79; 363/50; 363/74
[58] Field of Search ............ 364/480, 483, 492, 493; 307/31, 35, 59; 363/50, 74; 361/1, 79, 87

[56] References Cited

U.S. PATENT DOCUMENTS

| | | | |
|---|---|---|---|
| 3,317,794 | 5/1967 | Kotheimer | 361/79 X |
| 3,317,795 | 5/1967 | Steen | 361/79 X |
| 4,009,420 | 2/1977 | Martinex-dePison | 363/50 X |
| 4,092,708 | 5/1978 | Gerding et al. | 307/35 X |
| 4,160,282 | 7/1979 | Dolinar et al. | 361/79 X |

OTHER PUBLICATIONS

Analog Output Chips Shrink A-D Conversion Software, A. Mrozowski, Electronics, Jun. 23, 1977, pp. 130–133.
Single Chip Microprocessor Rules The Roast, B. Bell and D. Ogden, Electronics, Dec. 9, 1976, pp. 105–110.

*Primary Examiner*—Edward J. Wise
*Attorney, Agent, or Firm*—Stevens, Davis, Miller & Mosher

[57] ABSTRACT

In an overcurrent protecting apparatus for interrupting overcurrent in accordance with a coordination tripping curve characteristic, there are provided a microcomputer, a current/voltage converter for converting an overcurrent into a first voltage, D/A converting means for converting each output successively delivered from the microcomputer into a second voltage, and comparator means for comparing the first voltage with the second voltage. The delivering of the outputs from the microcomputer to the D/A converting means continues until an output is delivered from the comparator means to a first input of the microcomputer. Another comparator is also provided for delivering its output to a second input of the microcomputer when the first voltage is extremely high.

8 Claims, 13 Drawing Figures

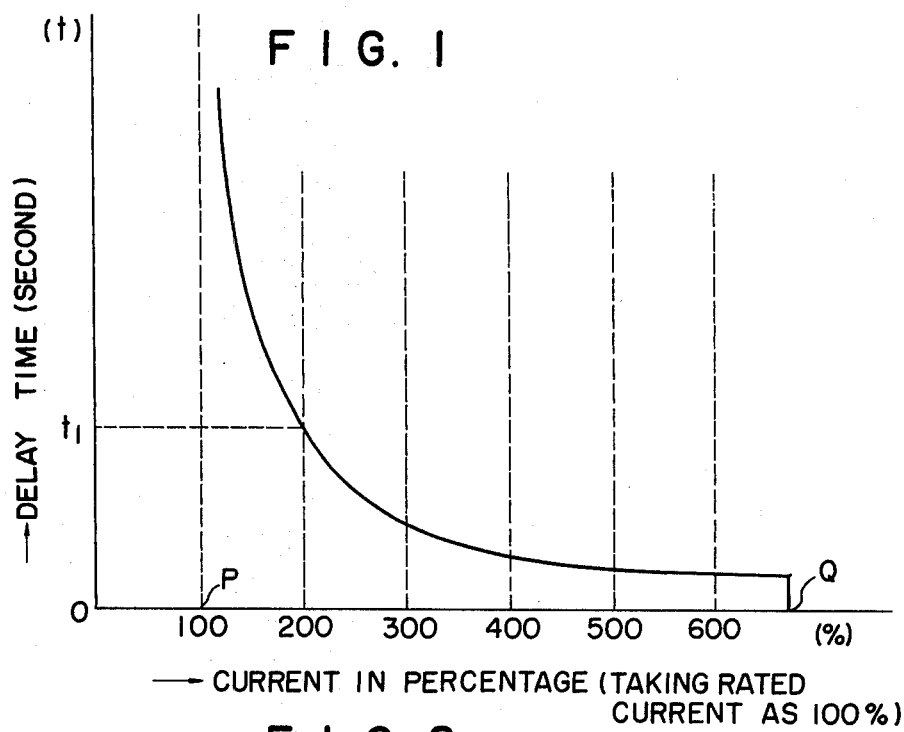
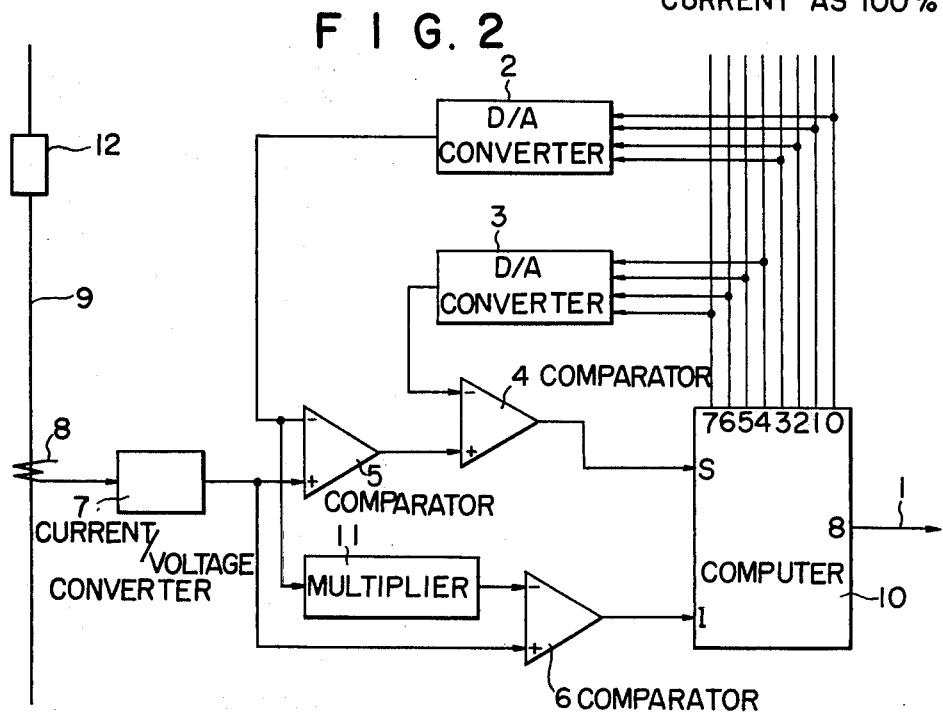

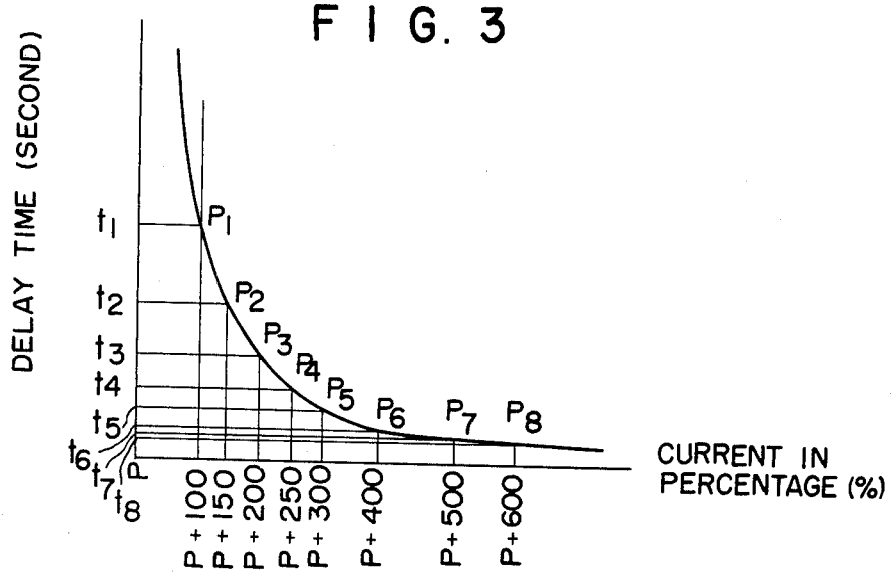
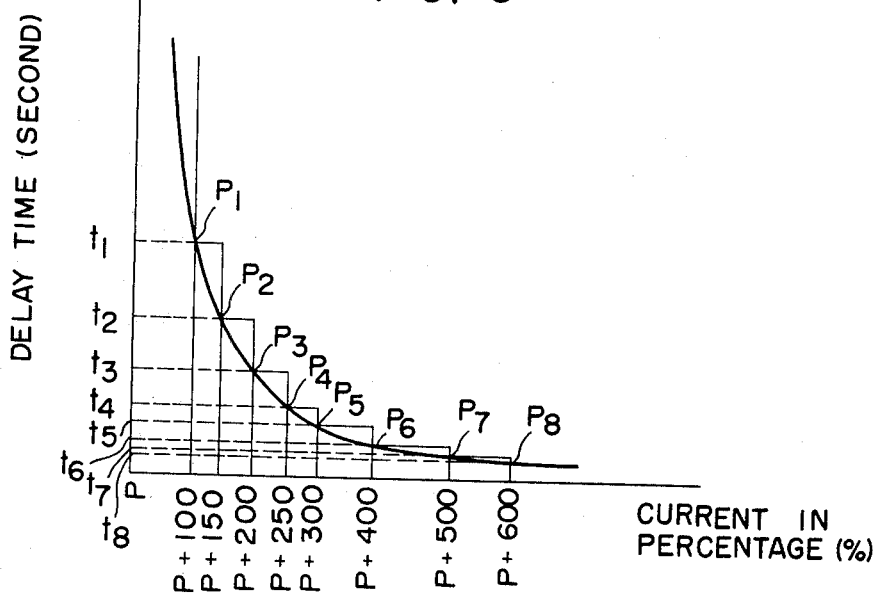

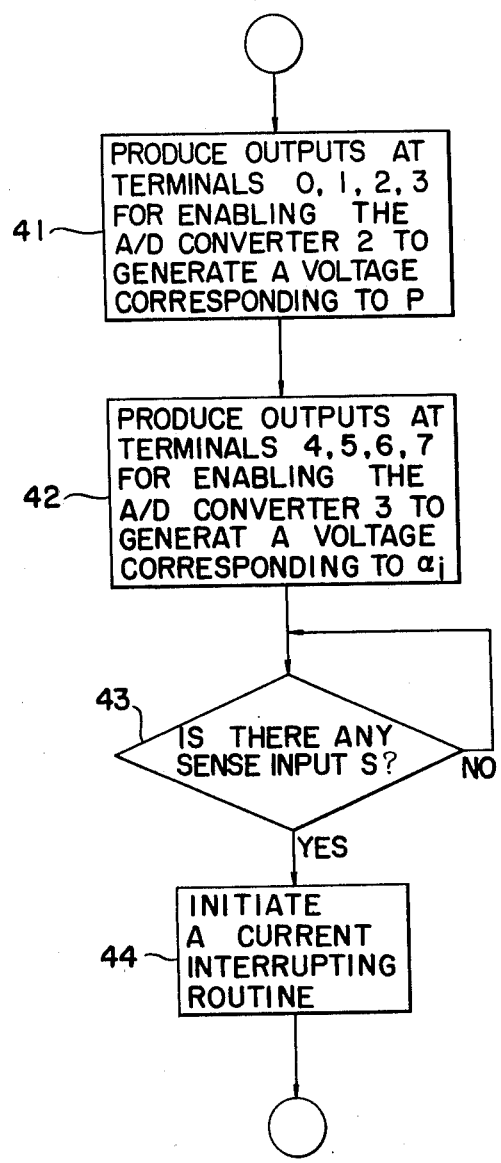

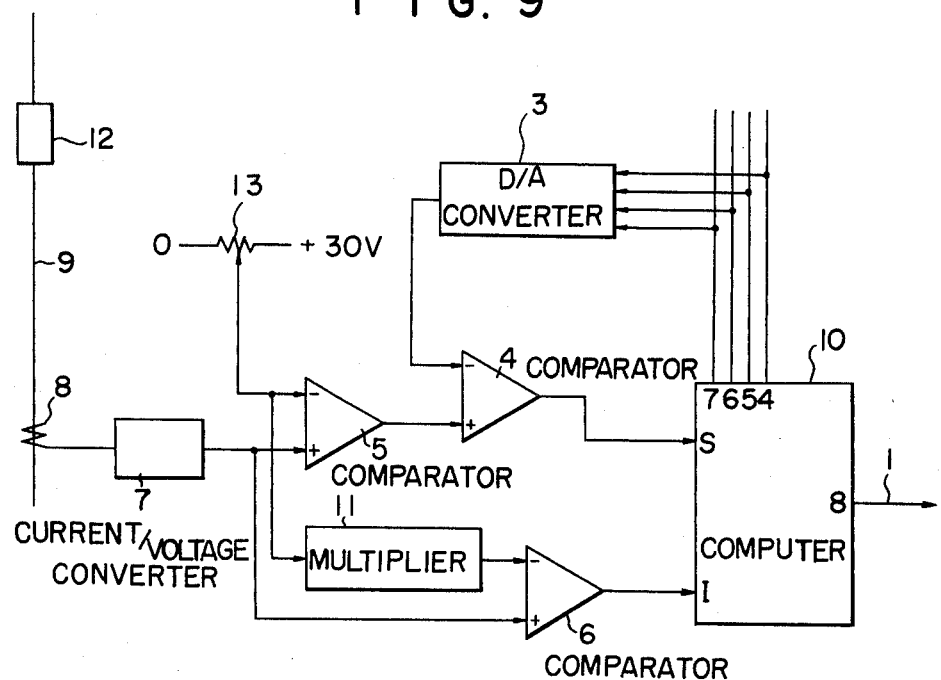
F I G. 9
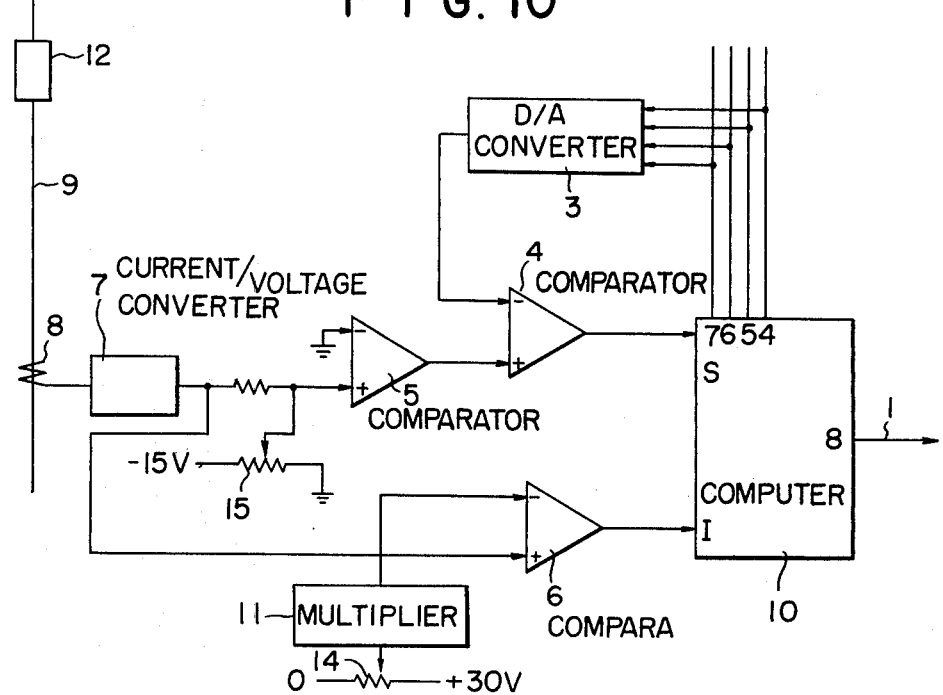
F I G. 10

OVERCURRENT PROTECTING APPARATUS

BACKGROUND OF THE INVENTION

This invention relates to an overcurrent protection apparatus utilizing a microcomputer for providing overcurrent interrupting characteristics having a capability to coordinate with other protection apparatus characteristics concerned with high precision.

In an ordinary overcurrent protection apparatus wherein an abnormal current flowing through a power line is detected for tripping a circuit breaker provided in the power line, it is essential that the overcurrent interrupting characteristics with coordinating capability have a performance which implements a specified coordination curve precisely. Heretofore, various attempts have been made for providing an overcurrent protection apparatus of the aforementioned type with the use of, for instance, an electronic circuit or a magnetically balancing type device. However, most of these apparatus require too many electronic components, or have insufficient capability in keeping the preset interruption characteristics immunized from the influence of ambient variations.

SUMMARY OF THE INVENTION

An object of the present invention is to provide an overcurrent protecting apparatus wherein coordination tripping curve implemented overcurrent interrupting characteristics can be preset with high precision.

Another object of the present invention is to provide an overcurrent protecting apparatus which is stable and reliable in operation having immunity from ambient variations.

Still another object of the invention is to provide an overcurrent protecting apparatus inclusive of a coordination tripping curve setting device whereby the setting of any desired overcurrent interrupting characteristic can be made with ease and precision.

According to the present invention, there is provided an overcurrent protecting apparatus for interrupting an overcurrent flowing through an electric power line in accordance with a current/time characteristic, comprising a microcomputer, a current/voltage converter for converting a current flowing through the power line into a voltage, D/A converting means connected to an output of the microcomputer for converting the output into a voltage, comparator means connected to compare the output of the current/voltage converter with the output of the D/A converting means, and to deliver an output to a first input of the microcomputer when the output of the current/voltage converter exceeds the output of the D/A converting means, and a separate comparator connected to compare the output of the current/voltage converter with a reference volage indicative of a current value to be interrupted instantaneously and to deliver an output to a second input of the microcomputer when the output of the current/voltage converter exceeds a voltage indicative of a current value to be interrupted instantaneously, the microcomputer including means for storing the current values and times corresponding to the current/time characteristic, means for delivering outputs indicative of current values sequentially, starting from the highest value to the lower values, to the input of the D/A converting means until an input is received at the first input, means for reading out a time value corresponding to the current value causing the reception of the first input, and means for delivering a tripping instruction after expiration of the time when the first input is received in the microcomputer, and for delivering the instruction immediately when the second input is received.

In modifications of the present invention, the D/A converting means comprises a first D/A converter for delivering a basic current value P and another D/A converter for delivering additional current values $\alpha_i$, while the comparator means comprises a first comparator for comparing the output of the first D/A converter with the output of the current/voltage converter, and a second comparator for comparing the output of the second D/A converter with the output of the first comparator and for delivering the output to the second input of the microcomputer.

Preferably a current/time setting board is associated with the microcomputer for presetting the current values and times corresponding to the current-time characteristic used in interrupting overcurrent flowing through the electric power line.

BRIEF DESCRIPTION OF THE DRAWINGS

In the accompanying drawings:

FIG. 1 is a coordination tripping curve showing the relation between the current flowing through a power line and the time required for interrupting a circuit breaker while maintaining a proper coordination with other coordination tripping curves contained in other protection apparatus connected to the power line;

FIG. 2 is a block diagram showing one embodiment of the present invention capable of providing an overcurrent interruption characteristic as shown in FIG. 1;

FIG. 3 is a curve showing a portion of the curve shown in FIG. 1 on an enlarged scale;

FIGS. 4 and 5 are flow charts for the execution of required programs in a microcomputer utilized in the embodiment of FIG. 2;

FIG. 6 is a result of approximation of the coordination tripping curve shown in FIG. 3;

FIG. 9 is a block diagram showing another embodiment of the present invention;

FIG. 10 is a block diagram showing still another embodiment of the present invention;

DESCRIPTION OF THE PREFERRED EMBODIMENTS

Figure 5:
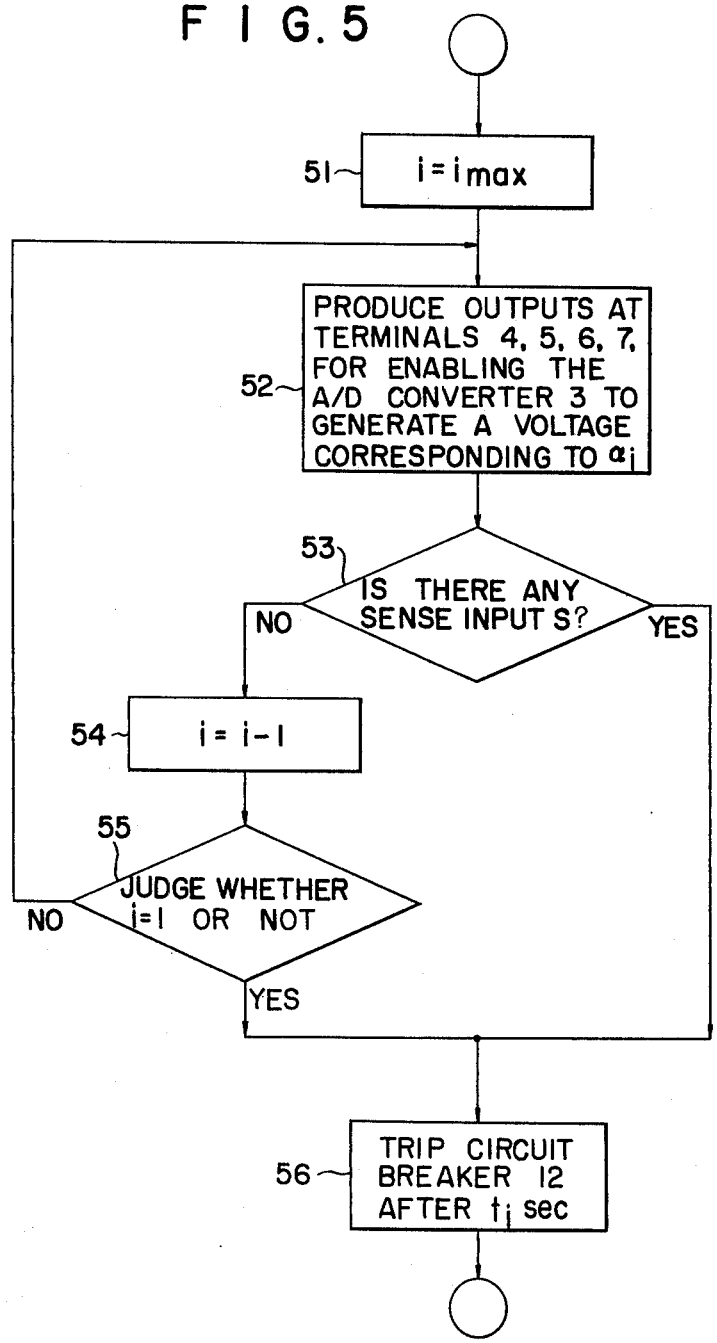

Referring now to FIG. 2 showing a preferred embodiment of the present invention, there is illustrated a power line 9 interconnecting a group of power sources with a number of loads, or prices of equipment.

In an ordinary operation, a current equal to or less than the rated value flows through the power line 9. However, in the case of an abnormal condition, an excessive current will flow through the power line 9, which must be interrupted by a circuit breaker 12 connected in the power line 9 in order to protect downstream equipment from damage. Assuming that the rated current of the power line is 100%, a relationship as shown in FIG. 1 must be kept between the current, in percentage, and the time between detection and tripping of the circuit breaker 12. With this relation, the current which is assumed to be 100% will not be interrupted, while an overcurrent of about 200% will be interrupted upon expiration of an interval $t_1$ from an instant of the detection of the overcurrent. The reason why the delay time is provided before the interruption of the current resides in the maintenance of coordination between operations of the circuit breaker 12 and other circuit breakers connected with the power line 9. For example, a circuit breaker located downstream of the circuit breaker 12 shall be tripped earlier than the circuit breaker 12.

The characteristic of FIG. 1 further shows that a current of a magnitude exceeding a point Q must be interrupted instantaneously, and that a current lower than a point P must not be interrupted. In FIG. 1, the point P is selected to be equal to the rated current. However, in actual usage, the current value of the location of the points P and Q, and the shape of the coordination tripping curve must be changeable in a preset stage in a wide range.

Turning now to FIG. 2 showing a preferred embodiment of the present invention wherein a microcomputer 10 is employed, an overcurrent flowing through the power line 9 is interrupted by the circuit breaker 12 upon expiration of a predetermined time defined by the coordination tripping curve shown in FIG. 1. More specifically, the coordination tripping curve is stored in a memory device of the microcomputer, the contents of which can be easily rewritten from the outside by utilizing a well known rewriting circuitry. The rewriting of the memory device is preferably carried out in a manner such that the value of point P is varied from 70% to 150% at 5% intervals, and the value of the point Q as well as the delay time for a current between the points P and Q are varied in accordance with the variation of the point P. It should be noted that, the value of K=(current corresponding to the point Q)/(current corresponding to the point P) is held substantially constant regardless of the variation of the point P.

The current flowing through the power line 9 is detected by a current transformer 8 and a current/voltage converter 7 which, in this example, is so selected that an output of 7.6 V is obtained when a rated current flows through the power line 9.

The apparatus of FIG. 2 further includes an operational amplifier 5 wherein the output of the converter 7 is compared with the output of a D/A converter 2. The difference voltage obtained from the operational amplifier 5 is applied to an input of a comparator 4. The output of the current/voltage converter 7 is further connected to an input of a comparator 6 while the output of the D/A converter 2 multiplied by a constant K in a multiplier 11 is connected to the other input of the comparator 6. The output of the comparator 6 is connected to an interruption input I of the microcomputer 10. The output of another D/A converter 3 is connected to the other input of the comparator 4, and the output of the comparator 4 is connected to a sense input S of the microcomputer 10.

It is assumed that the current in percentage of the point P is also represented by P% (the rated current being assumed to be 100%), and that the current in percentage of the point Q is also represented by Q%.

The values of P to be represented by the output of the D/A converter 2 are shown in Table 1 together with the outputs from the terminals 0, 1, 2, and 3 of the microcomputer 10 depending on the value of P preset in the microcomputer 10. Also, outputs brought out from the output of the D/A converter 2 by inputting the above described microcomputer terminal voltages are shown in Table 1.

TABLE 1

| Preset magnitude of P (%) | Output of D/A converter 2 (V) | Outputs (V) of microcomputer 10 at terminals | | | |
|---|---|---|---|---|---|
| | | 0 | 1 | 2 | 3 |
| 70 | 7 | 0 | 0 | 0 | 0 |
| 75 | 7.1 | 0 | 0 | 0 | 1.5 |
| 80 | 7.2 | 0 | 0 | 1.5 | 0 |
| 85 | 7.3 | 0 | 0 | 1.5 | 1.5 |
| 90 | 7.4 | 0 | 1.5 | 0 | 0 |
| 95 | 7.5 | 0 | 1.5 | 0 | 1.5 |
| 100 | 7.6 | 0 | 1.5 | 1.5 | 0 |
| 105 | 7.7 | 0 | 1.5 | 1.5 | 1.5 |
| 110 | 7.8 | 1.5 | 0 | 0 | 0 |
| 115 | 7.9 | 1.5 | 0 | 0 | 1.5 |
| 120 | 8.0 | 1.5 | 0 | 1.5 | 0 |
| 125 | 8.1 | 1.5 | 0 | 1.5 | 1.5 |
| 130 | 8.2 | 1.5 | 1.5 | 0 | 0 |
| 135 | 8.3 | 1.5 | 1.5 | 0 | 1.5 |
| 140 | 8.4 | 1.5 | 1.5 | 1.5 | 0 |
| 145 | 8.5 | 1.5 | 1.5 | 1.5 | 1.5 |

The D/A converter 2 or 3 is of type well known in the art.

The output of the D/A converter 2 corresponding to the value in percentage of P is compared in the operational amplifier 5 with the output of the current/voltage converter 7, and the output of the operational amplifier 5 is applied to an input of the comparator 4.

In the comparator 4, the amount of the overcurrent in excess of the percentage of P, that is the value of $a_i$, is determined. More specifically, the computer 10 can present any one of the voltages shown in Table 2 below at the output of the D/A converter 3, and this voltage is compared in the comparator 4 with the output of the operational amplifier 5. In the Table 2, there are also shown those voltages to be delivered from the terminals 4, 5, 6, and 7 of the microcomputer 10 for obtaining voltages indicative of the values of $a_i$ at the output of the D/A converter 3.

TABLE 2

| Value of $a_i$ in percentage to be compared in comparator 4 (%) | Output of D/A converter 3 | Outputs (V) of microcomputer 10 at terminals | | | |
|---|---|---|---|---|---|
| | | 4 | 5 | 6 | 7 |
| 0 | 0 | 0 | 0 | 0 | 0 |
| 50 | 1 | 0 | 0 | 0 | 15 |
| 100 | 2 | 0 | 0 | 15 | 0 |
| 150 | 3 | 0 | 0 | 15 | 15 |
| 200 | 4 | 0 | 15 | 0 | 0 |
| 250 | 5 | 0 | 15 | 0 | 15 |
| 300 | 6 | 0 | 15 | 15 | 0 |
| 350 | 7 | 0 | 15 | 15 | 15 |
| 400 | 8 | 15 | 0 | 0 | 0 |
| 450 | 9 | 15 | 0 | 0 | 15 |
| 500 | 10 | 15 | 0 | 15 | 0 |
| 550 | 11 | 15 | 0 | 15 | 15 |
| 600 | 12 | 15 | 15 | 0 | 0 |
| 650 | 13 | 15 | 15 | 0 | 15 |
| 700 | 14 | 15 | 15 | 15 | 0 |
| 750 | 15 | 15 | 15 | 15 | 15 |

The output from the D/A converter 2 corresponding to the value of P preset in the microcomputer 10 is multiplied by a constant K in a multiplier 11, and is compared in the comparator 6 with the output of the current/voltage converter 7. The object of this comparison is to determine whether the current flowing through the power line 9 reaches the current value represented by the point Q or not. While the output of the comparator 4 is connected to the sense input S of the microcomputer 10, the output of the comparator 6 is connected to the interrupting input I of the same computer 10.

The operation of the overcurrent protecting apparatus shown in FIG. 2 will now be described.

It is assumed that the apparatus operates based on the interruption characteristics as shown in FIG. 3, wherein the preset values of the current in percentage $P+\alpha_i$ are interrupted after the following times in seconds:

| P + 0   | not interrupted |
|---------|------------------|
| P + 100 | $t_1$ sec.      |
| P + 150 | $t_2$ sec.      |
| P + 200 | $t_3$ sec.      |
| P + 250 | $t_4$ sec.      |
| P + 300 | $t_5$ sec.      |
| P + 400 | $t_6$ sec.      |
| P + 500 | $t_7$ sec.      |
| P + 600 | $t_8$ sec.      |

The current values $P+\alpha_i$ preset in the microcomputer are not necessarily limited to the above described 8 values, but can be selected arbitrarily from 15 values (determined by the number of the inputs to the D/A converter 3) shown in Table 2, and the value of P may be preset to any one of those determined by the number of inputs of the D/A converter 2 as shown in Table 1.

The currents in percentage $P+\alpha_i$ ($i \leq 15$) and the delay times $t_i$ as listed above are stored in the microcomputer 10, and are used as data required in the execution of a program and routine as shown in FIGS. 4 and 5.

In the microcomputer 10, the program illustrated in FIG. 4 is executed. When the program is entered, the A/D converters 2 and 3 are set to the value so as to output a prescribed value at the steps 41 and 42, and the presence of the sense input is searched for in the following step 43. The step 43 is repeated until a sense input is received at the input S of the microcomputer 10. When the sense input is received, a current interrupting routine as shown in FIG. 5 is entered.

The presence of the sense input indicates that the current flowing through the power line 9 exceeds a current in percentage of $P+\alpha_i$. For this reason, the steps 43 searching the sense input are carried out starting from a current value chosen in considerating unnecessary delay. Thus, in the routine shown in FIG. 5, $i=i_{max}$ is set at the step 51, and the presence of the sense input is searched successively at the step 53 while the value of i in each time is subtracted by one (at step 54). In this way, the lowest limit of the current value producing the sense input is found.

In the microcomputer, the delay time $t_i$ for the value of i providing the sense input is calculated, and the circuit breaker 12 is tripped after $t_i$ seconds by an output delivered through the line 1.

According to the above described procedure, the overcurrent protective characteristic is approximated by a stepped line as shown in FIG. 6. However, if it is desired, the program may be so arranged that the protective characteristic is approximated by a broken line obtained by connecting the points $P_1, P_2, \ldots P_8$.

In a case where a current $K \times P$ % flows through the power line 9, the current must be interrupted instantaneously. When a current greater than $K \times P$ % flows through the line, an output is produced from the comparator 6, and this output is applied to the interrupting input I of the microcomputer 10. The execution of the program shown in FIG. 4 is thus interrupted, and an output for tripping the circuit breaker 12 is immediately issued through the line 1.

The microcomputer 10 is ordinarily formed in one chip containing a RAM (random access memory) and a ROM (read only memory). The microcomputer 10 has input/output terminals 0, 1, . . . , 8, a sense input S, and an interruption input terminal I. Although it is not shown, a series of clock pulses and a power source voltage are supplied from the outside to the microcomputer 10.

The microcomputer 10 used in this invention may preferably be of type TMS 9940 made by Texas Instrument Inc. or type TLCS-43 made by Tokyo Shibaura Denki Kabushikigaisha in Japan.

Figure 7:
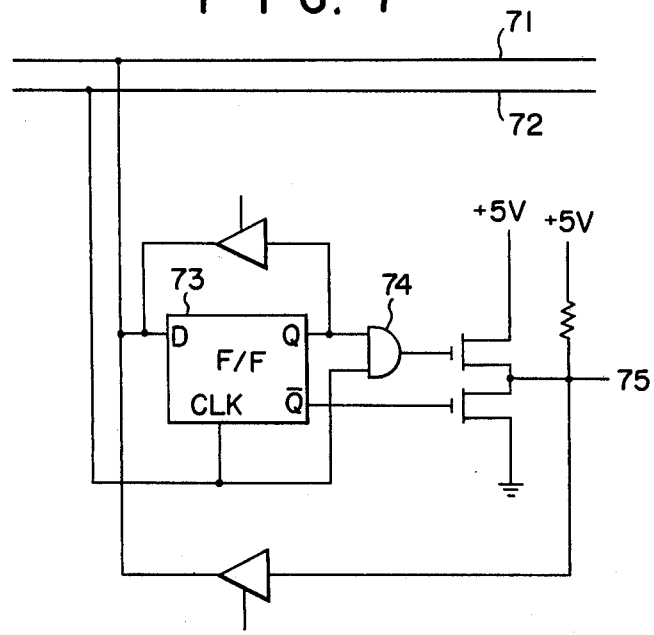
FIG. 7 is a circuit diagram showing an input/output terminal of the microcomputer.

Each of the input/output terminals is constituted by a well known circuit as shown in FIG. 7. In the case where the input/output terminal is used only for an output terminal, 0 V (earth potential) or +5 V is delivered from the output terminal 75 when a logic signal is applied to a line 71 in accordance with a program and another line 72 is made into WRITE MODE.

Figure 8:
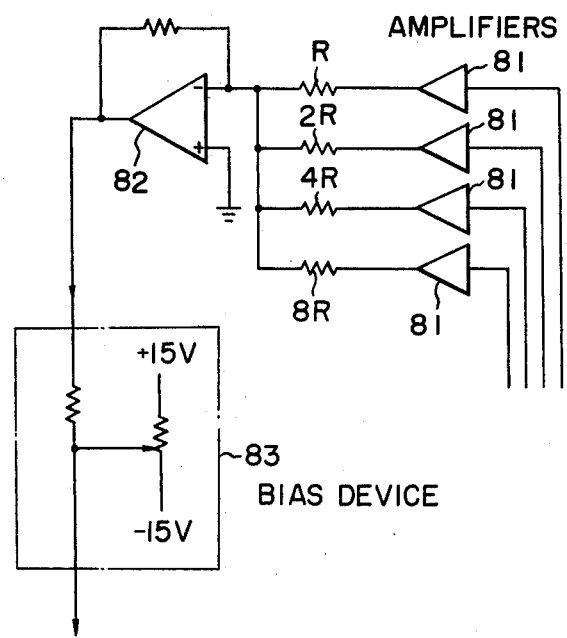
FIG. 8 is a circuit diagram showing a digital analog converter (D/A converter) used in FIG. 2.

In FIG. 8, there is illustrated an example (in the form of a ladder resistor circuit) of a well known converter which is used as the D/A converter 2 or 3 shown in FIG. 2. In this example, each amplifier 81 converts +5 V of the output from the microcomputer 10 to +1.5 V in the case of the D/A converter 2, and to +15 V in the case of the D/A converter 3. A bias device 83 is used in the D/A converter 2 for the purpose of applying a bias voltage of 7 V to the output of the converter.

The comparators 4 and 6 shown in FIG. 2 are of well known types, whereas the comparator 5 is of a type delivering +5 V when the voltage applied to the positive terminal is greater than the voltage applied to the negative terminal, and the difference exceeds 0.1 V. The terminals S and I of the microcomputer 10 can discriminate the presence of the sense input and the interrupting input, respectively, when these inputs are equal to or greater than +5 V.

A modification of the present invention is illustrated in FIG. 9 wherein elements corresponding to those shown in FIG. 2 are designated by the same reference numerals.

In this modification, the D/A converter 2 having the biasing device is omitted, and the value of P is set by a sliding resistor 13. In this way, a function of presetting P can be omitted from the computer 10.

Another modification of the invention is illustrated in FIG. 10 wherein also like members and parts are designated by the same reference numerals.

In this modification, although the manner of setting the value of P, by utilizing a sliding resistor 15, is different from the modification shown in FIG. 9, the feature of eliminating the function of presetting the value of P from that of the microcomputer is similar to the first modification. In this modification, the setting of a reference voltage for the comparator 6 is also achieved by another sliding resistor 14 interlocked with the sliding resistor 15.

Figure 12:
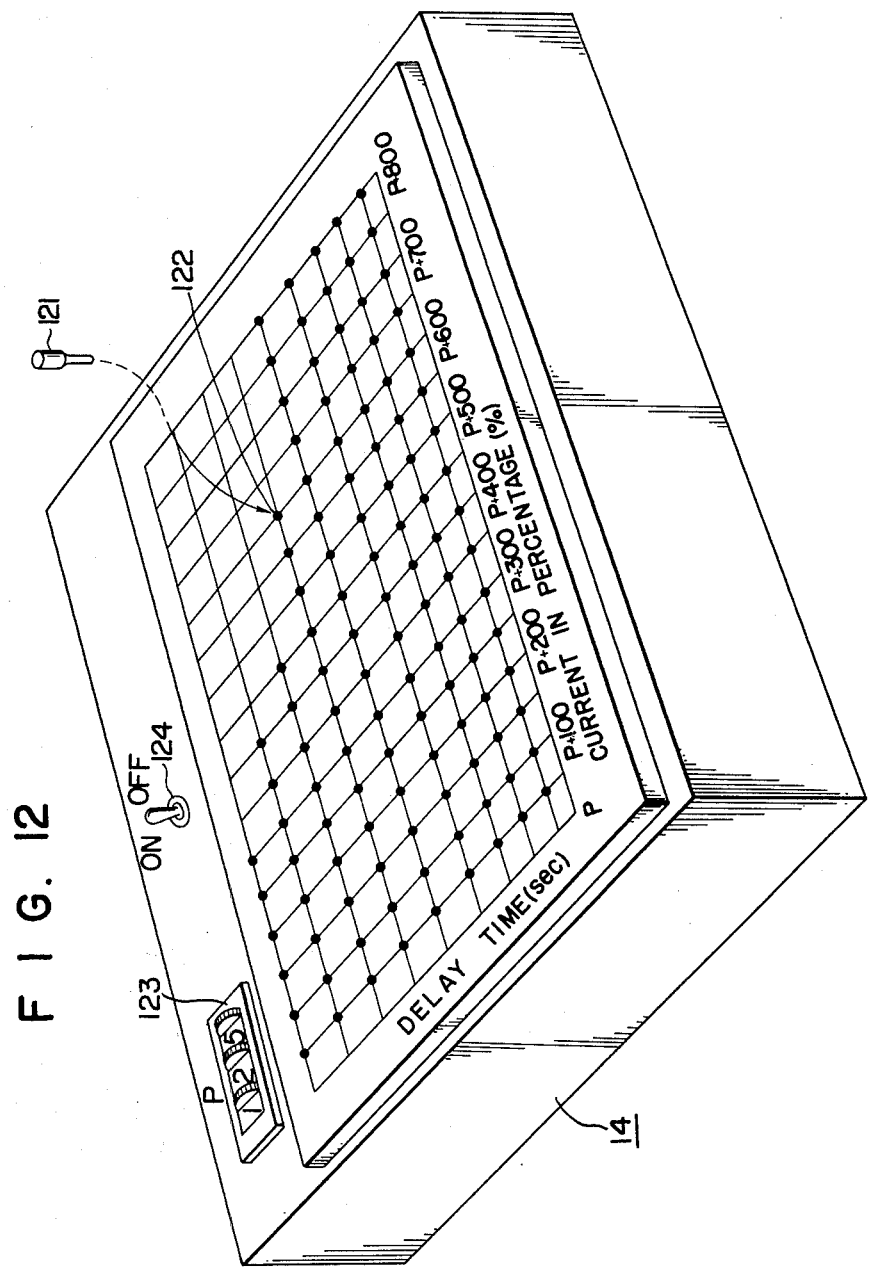
FIG. 12 is a perspective view of the coordination tripping curve setting board.

The values of the current in percentage $P+\alpha_i$ and the delay times $t_i$ as shown in FIG. 3 may be preset in the microcomputer 10 by the use of a current-time setting board 14 as shown in FIG. 12 wherein also like members and parts as in FIG. 2 are designated by the same reference numerals.

Figure 13:
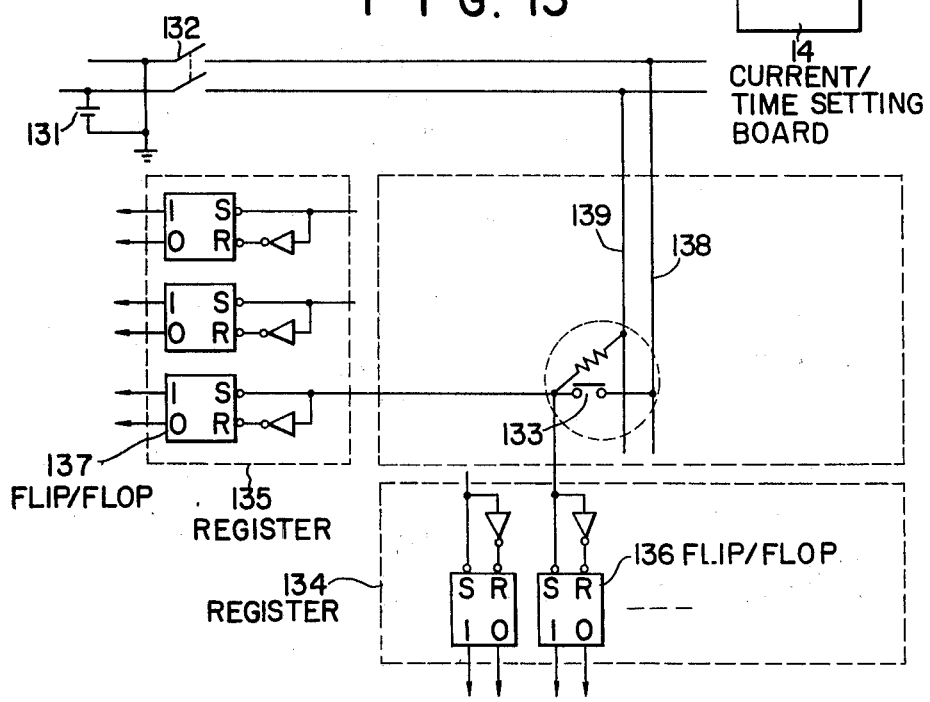
FIG. 13 is a connection diagram of the coordination tripping curve setting board.

In the current-time setting board shown in FIG. 12, sixteen current values from P to P+750% are presented along X axis, while the delay times of substantially similar number are presented along Y axis of a rectangular coordinate system. Assuming that the number of the delay times is also 16, there are a total of 16×16=256 points having coordinates selected from the current values and delay times. At these points, coordination tripping curve setting switches, each made up of a hole 122 and a plug 121 to be inserted therein, are provided in a matrix-like pattern. The switch is opened when the plug 121 is pulled out of the hole 122. On the coordination tripping curve setting board 14, there are further provided digital switches 123 used for setting the value of P%, and a power switch 124 corresponding to a power switch 132 in FIG. 13 showing a circuit associated with the coordination tripping curve setting board 14. In this circuit, the voltage of a power source 131 is applied across power lines 138 and 139 through the power switch 132. Upon closing a switch 133 which corresponds to one of the switches arranged in a matrix form in the coordination tripping curve setting board, flip-flops 96 and 97 connected thereto are set, and when the switch 133 is opened, the two flip-flops are reset. The flip-flops 136 are arranged in a row in a register 134 so as to correspond to the currents in percentage $P+\alpha_i$. That is, the leftmost flip-flop 136 corresponds to a current in percentage P+50%, while the following flip-flops 136 correspond to currents in percentage of P+100%, P+150%, and so on.

On the other hand, the flip-flops 137 are arranged in a row in a register 135 so as to correspond to delay times $t_i$. That is, the uppermost flip-flop 137 corresponds to a longest delay time, and the following flip-flops 137 correspond to succeeding delay times of reduced values.

Figure 11:
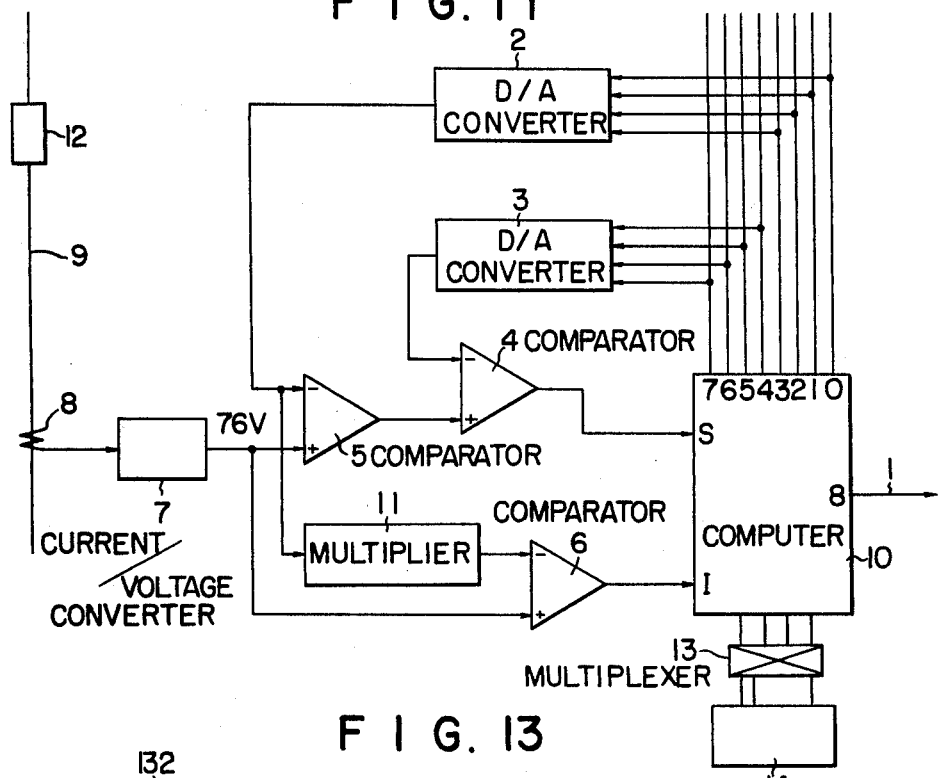
FIG. 11 is a block diagram similar to FIG. 2, wherein a coordination tripping curve setting board is further provided.

The registers 134 and 135 are connected to the microcomputer 10 through a multiplexer 13 shown in FIG. 11. In order to utilize four input/output terminals of the microcomputer 10, the multiplexer 13 selectively connects four bits out of the registers 134 and 135 alternately starting from the leftmost end of the registers, so that these bits are read out to be stored in the microcomputer 10. In this manner, the values shown in Tables 1 and 2, and a cross-reference between these values and the bits in the register 134 are all stored in the memory device of the microcomputer 10.

In operation, an operation of the current-time setting board 14 firstly operates the digital switches 123 for setting the value of P, and then operates the switches such as 133 in FIG. 13 for setting the current values and the delay times in accordance with an overcurrent interruption characteristic of a coordinating nature as shown in FIG. 3. For instance, the plugs 121 in FIG. 12 are inserted in the holes 122 at predetermined positions, thereby providing further advantageous features of permitting the operator to recognize the overcurrent protection characteristic at a glance.

In relation to the operating step 41 of the flow chart shown in FIG. 4, the microcomputer 10 reads out the setting of the digital switches 123 shown in FIG. 12, thereby knowing the value of P, and produces at the output terminals 0, 1, 2, 3 these voltages adapted to produce a voltage corresponding to the value of P at the output of the A/D converter 2 as described hereinbefore. Furthermore, for the purpose of knowing $\alpha_i$ and $t_i$ at the time of executing the operating steps 52 and 56 in the flow chart shown in FIG. 5, the microcomputer 10 surveys the registers 134 and 135 in FIG. 13 from right to left and from the bottom to upward, respectively. Upon finding a pair of flip-flops set to "1" on the respective registers, the microcomputer calculates $\alpha_i$ and $t_i$ corresponding to the positions of the flip-flops while referring to Tables 1 and 2 stored in the microcomputer 10.

For the execution of the next following program loop, the microcomputer starts surveying the flip-flops in the registers 134 and 135, leftwardly and upwardly, starting from the bit positions of the above described pair of flip-flops, and finds out the next pair of flip-flops which have been set to "1".

The above described operation is repeated for required times for finding out the values of $\alpha_i$ and $t_i$ to be used in the execution of the subsequent program loops.

When it is desired to reduce the time required for the microcomputer in finding out the values of $\alpha_i$ and $t_i$ successively, the program of the microcomputer may be so arranged that the setting of the digital switches 123 and the registers 134 and 135 of the coordination tripping curve setting board 14 are read out immediately after the entrance of the program, and the values of $P+\alpha_i$ and $t_i$ (i=1, 2, 3, ...) thus read out are stored in the memory device of the microcomputer. According to this method, it is not necessary to read the settings of the current-time setting board for the execution of subsequent program steps, but merely the contents of the memory device are referred to. For this reason, if desired, the coordination tripping curve setting board may be eliminated from the circuit after the settings on the board are stored in the microcomputer 10.

What is claimed is:

1. An overcurrent protecting apparatus for interrupting overcurrent flowing through an electric power line in accordance with a current/time characteristic, comprising a microcomputer, a current/voltage converter for converting a current flowing through said power line into a voltage, D/A converting means for converting an output of said microcomputer into a voltage, comparator means connected to compare the output of said current/voltage converter with the output of said D/A converting means, and to deliver an output to a first input of said microcomputer when the output of said current/voltage converter exceeds the output of said D/A converting means, and a separate comparator connected to compare the output of said current/voltage converter with a reference voltage indicative of a current value to be interrupted instantaneously and to deliver an output to a second input of said microcomputer when the output of said current/voltage converter exceeds said reference voltage, said microcomputer including means for storing current values and time values corresponding to said current/time characteristic, means for delivering outputs indicative of current values sequentially, starting from the highest value to the lowest value, to the input of said D/A converting means until an input is received at said first input, means for reading out a time value corresponding to the current value causing the receiption of said first input, and means for delivering a tripping instruction after expiration of said time value when said first input is received in the microcomputer, and for delivering said tripping instruction immediately when said second input is received.

2. An overcurrent protecting apparatus as set forth in claim 1 wherein said D/A converting means comprises a first D/A converter converting an output of said microcomputer to a voltage representing a current value P, and a second D/A converter converting an output of said microcomputer to a voltage representing an overcurrent value $\alpha_i$, said comparator means comprises a first comparator comparing the output representing P with the output of said current/voltage converter, and a second comparator comparing the output of said first comparator with the output representing $\alpha_i$ of said second D/A converter, the output of said second comparator being connected to said first input of said microcomputer.

3. An overcurrent protecting apparatus as set forth in claim 2 wherein said reference voltage indicative of a current value to be interrupted instantaneously is obtained as an output of a multiplier multiplying the output representing P from said first D/A comparator by a constant K.

4. An overcurrent protecting apparatus as set forth in claim 1 wherein said D/A converting means comprises a single D/A converter for converting an output of said microcomputer into a voltage representing an overcurrent value $\alpha_i$, while said comparator means comprises a first comparator and a second comparator, and a sliding resistor for presetting a voltage representing a current value P, said first comparator comparing the output of said current/voltage converter with said voltage representing P and said second comparator comparing the output of said first comparator with the output representing $\alpha_i$ of said single D/A converter, and the output of said second comparator is connected to said first input of said microcomputer.

5. An overcurrent protecting apparatus as set forth in claim 4 wherein said reference voltage indicative of a current value to be interrupted instantaneously is obtained as an output of a multiplier multiplying the voltage representing P preset in said sliding resistor.

6. An overcurrent protecting apparatus as set forth in claim 1 wherein said D/A converting means comprises a single D/A converter for converting an output of said microcomputer into a voltage representing an overcurrent value $\alpha_i$, said comparator means comprises a first comparator and a second comparator, and a sliding resistor for presetting a voltage representing a current value P which is connected to be subtracted from the output of said current/voltage converter, said first comparator comparing the subtracted result with a zero voltage, and said second comparator comparing the output of said first comparator with the output representing $\alpha_i$ from said single D/A converter, the output of said second comparator being connected to said first input of said microcomputer, and wherein another sliding resistor is provided, a voltage obtained from said another sliding resistor is multiplied by a multiplier and compared in said separate comparator with the output of said current/voltage converter, and the output of said separate comparator is connected to the second input of said microcomputer.

7. An overcurrent protecting apparatus as set forth in claim 1 which further comprises a coordination tripping curve setting board including switches arranged in a matrix form and digital switches, and said current values and delay times corresponding to said current/time characteristic are firstly preset in said coordination tripping curve setting board, and then read into the memory of said microcomputer.

8. An overcurrent protecting apparatus as set forth in claim 7 wherein relations between current values $P+\alpha_i$ and time values are preset by said switches arranged in a matrix pattern, while the value of P is preset by said digital switches, where P represents a current value and $\alpha_i$ an overcurrent value.

* * * * *